US010449693B2

(12) United States Patent
Traini et al.

(10) Patent No.: US 10,449,693 B2
(45) Date of Patent: Oct. 22, 2019

(54) MULTI-FUNCTIONAL WORK CENTRE FOR CUTTING AND MACHINING PLATES OF STONE, MARBLE, OR, IN GENERAL, NATURAL OR SYNTHETIC STONE MATERIAL, OR CERAMIC MATERIAL

(71) Applicant: BIESSE S.p.A, Chiusa di Ginestreto (Pesaro Urbino) (IT)

(72) Inventors: Matteo Traini, Chiusa di Ginestreto (IT); Marco Belli, Chiusa di Ginestreto (IT)

(73) Assignee: Biesse S.p.A., Pesaro Urbino (IT)

( * ) Notice: Subject to any disclaimer, the term of this patent is extended or adjusted under 35 U.S.C. 154(b) by 215 days.

(21) Appl. No.: 15/440,583

(22) Filed: Feb. 23, 2017

(65) Prior Publication Data
US 2017/0252945 A1 Sep. 7, 2017

(30) Foreign Application Priority Data

Mar. 3, 2016 (IT) .................. 102016000022557

(51) Int. Cl.
*B24B 7/22* (2006.01)
*B28D 1/00* (2006.01)
(Continued)

(52) U.S. Cl.
CPC .............. *B28D 1/003* (2013.01); *B24B 7/224* (2013.01); *B28D 1/18* (2013.01); *B28D 7/005* (2013.01);
(Continued)

(58) Field of Classification Search
CPC .......... B24B 7/224; B28D 1/003; B28D 1/18; B28D 7/005; B28D 7/04; G05B 19/182; G05B 2219/37355
(Continued)

(56) References Cited

U.S. PATENT DOCUMENTS 4,205,835 A * 6/1980 Gerber .................. A41H 15/00
269/21
4,822,219 A * 4/1989 Wood ...................... B23Q 3/002
144/252.1
(Continued)

FOREIGN PATENT DOCUMENTS

DE 3839150 C1 1/1990
EP 2682227 A1 1/2014
(Continued)

*Primary Examiner* — Joseph J Hail
*Assistant Examiner* — Arman Milanian
(74) *Attorney, Agent, or Firm* — Young Basile Hanlon & MacFarlane, P.C.

(57) ABSTRACT

A numeric-control work center can be used for carrying out cutting operations or grinding and/or milling operations on plates of stone, marble, or, in general, natural or synthetic stone material, or ceramic material. The work center comprises at least one working head movable along at least two mutually orthogonal horizontal axes on a work surface. The work surface includes a rigid supporting board, which defines a first planar supporting surface, and a series of sacrificial elements rigidly connected to the rigid supporting board. The sacrificial elements are arranged in positions spaced apart from each other and define a second supporting surface located at a higher level than the first planar supporting surface, so that a cutting tool coupled to the working head engraves the sacrificial elements, without interfering with the supporting board during a cutting operation on a plate resting on the sacrificial elements, whichever is the path followed by the cutting tool. Between the sacrificial elements there remain free portions of the planar surface of the supporting board, so that they can be removably engaged by one or more blocks for supporting and holding the plate. These blocks project above the sacrificial elements and are adapted to define a third supporting surface, located at a higher level than the second supporting surface, for supporting and holding a plate during a milling or grinding operation on the plate.

17 Claims, 4 Drawing Sheets

(51) Int. Cl.
*B28D 1/18* (2006.01)
*B28D 7/00* (2006.01)
*B28D 7/04* (2006.01)
*G05B 19/18* (2006.01)

(52) U.S. Cl.
CPC ............. *B28D 7/04* (2013.01); *G05B 19/182* (2013.01); *G05B 2219/37355* (2013.01)

(58) Field of Classification Search
USPC .............................................. 269/289 R, 309
See application file for complete search history.

(56) References Cited

U.S. PATENT DOCUMENTS

| | | | | |
|---|---|---|---|---|
| 5,562,276 A | * | 10/1996 | Blick | ................... B23Q 16/001 269/20 |
| 6,286,822 B1 | * | 9/2001 | Blick | ....................... B24B 9/08 269/21 |
| 6,817,933 B2 | * | 11/2004 | Blick | .................... B24B 41/068 269/21 |
| 2011/0183594 A1 | * | 7/2011 | Toben | .................... B23K 10/00 454/66 |
| 2012/0227726 A1 | * | 9/2012 | Higgins | ................. B28D 1/047 125/14 |
| 2014/0203485 A1 | * | 7/2014 | Forlong | ............. B23K 37/0461 269/309 |
| 2015/0013514 A1 | * | 1/2015 | Strauss | .................. B26D 1/045 83/29 |

FOREIGN PATENT DOCUMENTS

| | | | |
|---|---|---|---|
| FR | 1499418 A | 10/1967 | |
| IT | ITT020080695 A1 * | 3/2010 | ........... B23Q 11/085 |
| IT | 1391863 B1 | 1/2012 | |
| IT | TO20130215 A1 | 9/2014 | |
| WO | 2006043294 A1 | 4/2006 | |
| WO | 2011039700 A1 | 4/2011 | |

* cited by examiner

MULTI-FUNCTIONAL WORK CENTRE FOR CUTTING AND MACHINING PLATES OF STONE, MARBLE, OR, IN GENERAL, NATURAL OR SYNTHETIC STONE MATERIAL, OR CERAMIC MATERIAL

TECHNICAL FIELD

The present invention relates to numeric-control work centres for machining plates of stone material, whether natural or synthetic, or ceramic material. The invention relates in particular to a work centre of the type comprising a work surface and at least one working head that is movable on the work surface in at least two mutually orthogonal horizontal directions.

BACKGROUND

According to the most conventional technique, a plate to be worked, for example for producing a top for a kitchen or bathroom cabinet, is cut starting from a plate of large dimensions on a machine that usually is dedicated only to the cutting operation (typically a bridge-like milling machine), after which the semi-finished product obtained thereby is usually transferred into a work centre of the type referred to above, to undergo subsequent milling, grinding, or polishing machining operations.

In the machine dedicated to the cutting operation, the plate to be cut is supported on a "sacrificial" supporting surface, typically defined by a board or frame made of wood or other sacrificial material, in such a way that the disk blade used in the cutting operation, passing through the plate, cuts the sacrificial supporting surface without interfering with the top surface of the bench of the machine. When the cut semi-finished product is transferred onto the numeric-control work centre, it is supported and held in a position that is raised with respect to the bench of the work centre by means of a plurality of supporting and holding blocks, which can be positioned as desired on the top surface of the bench of the work centre in such a way that machining operations on the plate, such as grinding and polishing of the lateral peripheral surface of the plate, can be performed by the working head without interfering with the bench of the work centre. According to the most usual technique, these supporting blocks each make use of a bottom suction cup and a top suction cup, which can be activated by vacuum to maintain in a desired position each block on the bench of the work centre and to maintain in a fixed position the plate supported on the block. Once again according to the usual technique, each supporting block constitutes an independent unit, which can be positioned as desired on the bench of the work centre. Each block is connected by means of hoses to a source of vacuum or it incorporates a vacuum source (see EP 2 682 227 A1 in the name of the present applicant).

The present applicant has early realized of the problem of providing a multi-functional work centre that is able to sum up in one and the same machine the specific capabilities of a bridge milling machine and those of a work centre. For instance, in Italian patent IT 1 391 863, the present applicant has proposed a work centre provided with a removable sacrificial supporting surface, which has a structure similar to that of a roller shutter, and which can be displaced between an operative position extended over the bench of the machine, when the work centre is to be used for carrying out cutting operations, and an inoperative rolled-up condition, where the bench of the work centre is left free for positioning thereon suction-cup supporting blocks adapted to receive thereon a plate that is to undergo milling or grinding machining operations. A further solution for a work centre with a removable sacrificial supporting surface has formed the subject of Italian patent IT 1 416 728 filed in the name of the present applicant. The aforesaid known solutions, however, lead to a relatively complicated structure and arrangement, which are not always justified.

Document No. DE 38 39 150 C1 describes a numeric-control work centre for machining plates of stone, marble, or, in general, natural or synthetic stone material, or ceramic material, comprising:
  a work surface; and
  at least one working head movable on the work surface in at least two mutually orthogonal horizontal directions, wherein the working head can be coupled either to a tool for performing grinding or milling machining operations on the plate or to a tool for cutting the plate, wherein said work surface includes:
    a rigid supporting board, defining a first planar supporting surface; and
    a series of elements for supporting a plate during a cutting operation, said elements being rigidly connected to said rigid supporting board and defining a second supporting surface located at a higher level than said first planar supporting surface of said supporting board, so that a cutting tool coupled to said at least one working head can carry out a cutting operation on a plate resting on said plate-supporting elements, without interfering with the supporting board,
  said machine including a third supporting surface located at a higher level than said second supporting surface, for supporting and holding a plate during a grinding or milling operation performed on the plate by using a tool coupled to said working head and suitable for performing grinding or milling machining operations on the plate.

As a result, the above known work centre is able to carry out both cutting operations and grinding or milling machining operations. However, it does not make use of sacrificial elements, and the cutting operations are considerably limited by the fact that the cutting tool can move with respect to the work surface only along orthogonal lines, within the free spaces between the elements that support the plate during the cutting operation.

SUMMARY

The object of the present invention is to provide a multi-functional work centre that can be used both for carrying out cutting operations and for carrying out grinding and/or milling operations on the plate, while having a simple and low-cost structure and without posing any limitations on the path that the cutting tool can follow in carrying out a cutting operation.

With a view to achieving the aforesaid object, the subject of the invention is a numeric-control work centre for machining plates of stone, marble, or, in general, natural or synthetic stone material, or ceramic material, comprising:
  a work surface; and
  at least one working head movable on the work surface in at least two mutually orthogonal horizontal directions, wherein the working head can be coupled either to a tool for performing grinding and/or milling machining operations on the plate or to a tool for cutting the plate, wherein said work surface includes:
    a rigid supporting board, defining a first planar supporting surface; and a series of elements for supporting a plate during a cutting operation, said elements being rigidly connected to said rigid supporting board and defining a second supporting surface located at a higher level than said first planar supporting surface of said supporting board so that a cutting tool coupled to said at least one working head can carry out a cutting operation on a plate resting on said plate-supporting elements without interfering with the supporting board, said machine including a third supporting surface located at a higher level than said second supporting surface, for supporting and holding a plate during a grinding and/or milling operation on the plate performed by using a tool coupled to said working head and suitable for grinding or milling machining operations on the plate, said work centre being characterized in that:

said elements for supporting the plate during a cutting operation are rigid sacrificial elements secured to the work surface and made of a sacrificial material, such as wood or the like, such that a cutting tool used in the cutting operation can pass through the plate and also engrave the sacrificial elements without interfering with the work surface of the machine, so that the cutting tool can be guided according to any path on the work surface without being forced to avoid interference with said sacrificial elements;

said third supporting surface is defined by a plurality of supporting blocks, each of which has a bottom suction cup that can be selectively activated for adhering to said work surface, and a top suction cup, which can be selectively activated for holding thereon a plate that is to undergo a milling or grinding operation;

defined between the sacrificial elements are free portions of said first planar surface of the supporting board, confined between said sacrificial elements and distributed throughout the entire extension of said first surface, so that they can be used for removably engaging said supporting blocks on said free portions; and in the condition where said supporting blocks are engaged on respective free portions of the work surface, the top suction cups of the supporting blocks project above said sacrificial elements and define said third supporting surface.

In the preferred embodiment, the sacrificial elements are in the form of slats secured in any way (for example, bolted) on said supporting board and arranged so as to form at least one array of slats arranged spaced apart from one another. The distancing between the slats is greater than a horizontal dimension of the aforesaid supporting blocks in such a way as to leave free between the slats the aforesaid portions of surface suited to engagement of the supporting blocks. In an example, two arrays of parallel slats are provided arranged spaced apart from each other, along two different directions.

As clearly apparent from the foregoing description, the supporting board of the work centre according to the invention sums up in itself the characteristics of a sacrificial supporting surface and the characteristics of a supporting surface of the bench of a conventional work centre that is designed to receive thereon the blocks for supporting and holding a plate to be subjected to machining operations subsequent to a cutting operation.

To carry out a cutting operation, the plate is set resting on the sacrificial supporting surface, whereas to carry out operations of grinding or milling of the plate, the latter is set resting on one or more supporting and holding blocks, which are positioned as desired on free portions of the first supporting surface of the supporting board that are confined between sacrificial elements of the sacrificial supporting surface. During the cutting operation, the cutting tool is free to follow any desired path without the limitations of DE 38 39 150 C1.

The present invention is also directed to the method of use of the work centre described above.

BRIEF DESCRIPTION OF THE DRAWINGS

Further characteristics and advantages of the invention will appear from the following description with reference to the annexed drawings, which are provided purely by way of non-limiting example and in which.

DETAILED DESCRIPTION

Figure 1:
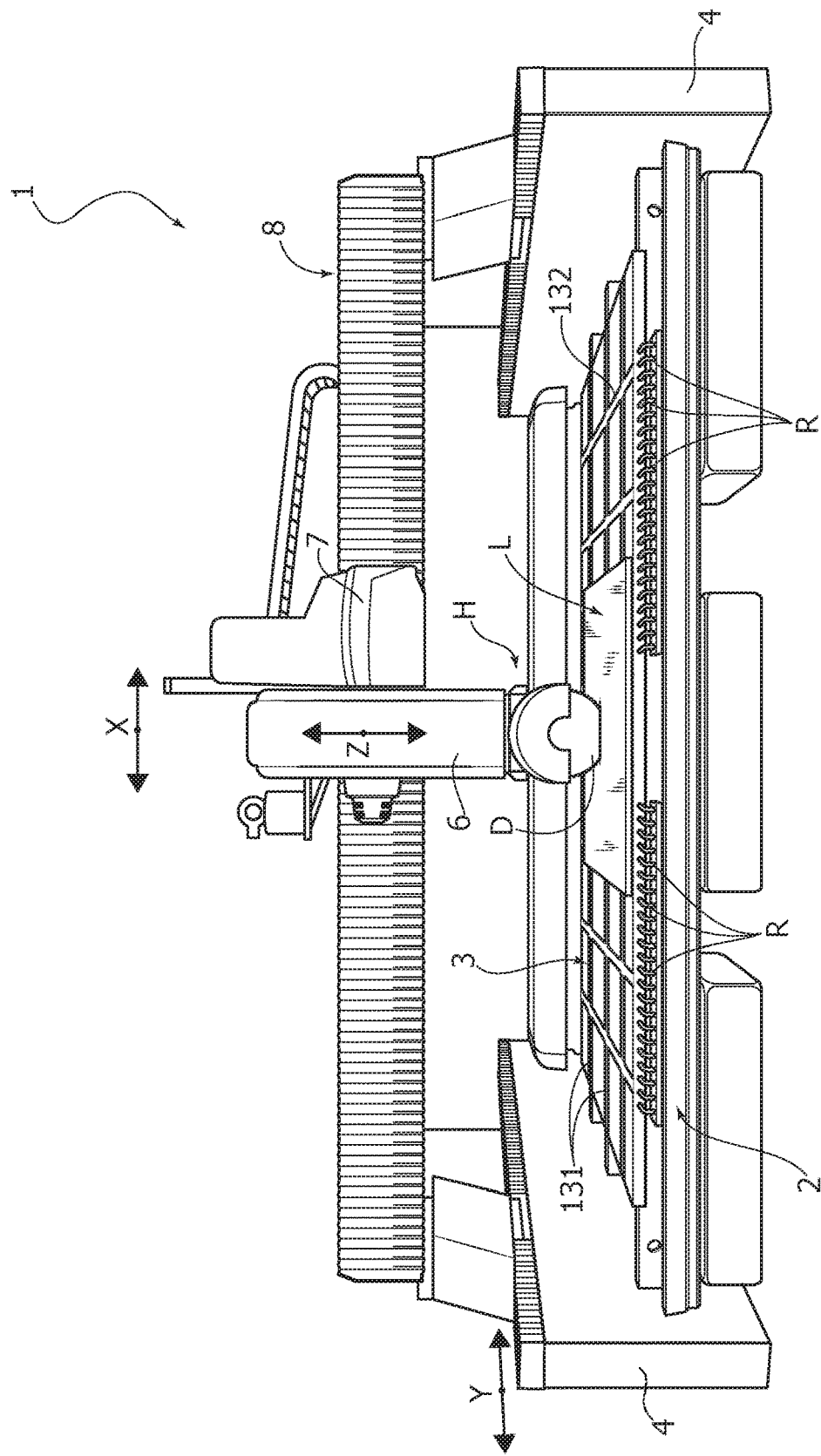
FIG. 1 is a front perspective view of an examplary embodiment of a work centre according to the invention, illustrated during execution of a cutting operation on a plate arranged on the sacrificial supporting surface of the work centre.
Figure 2:
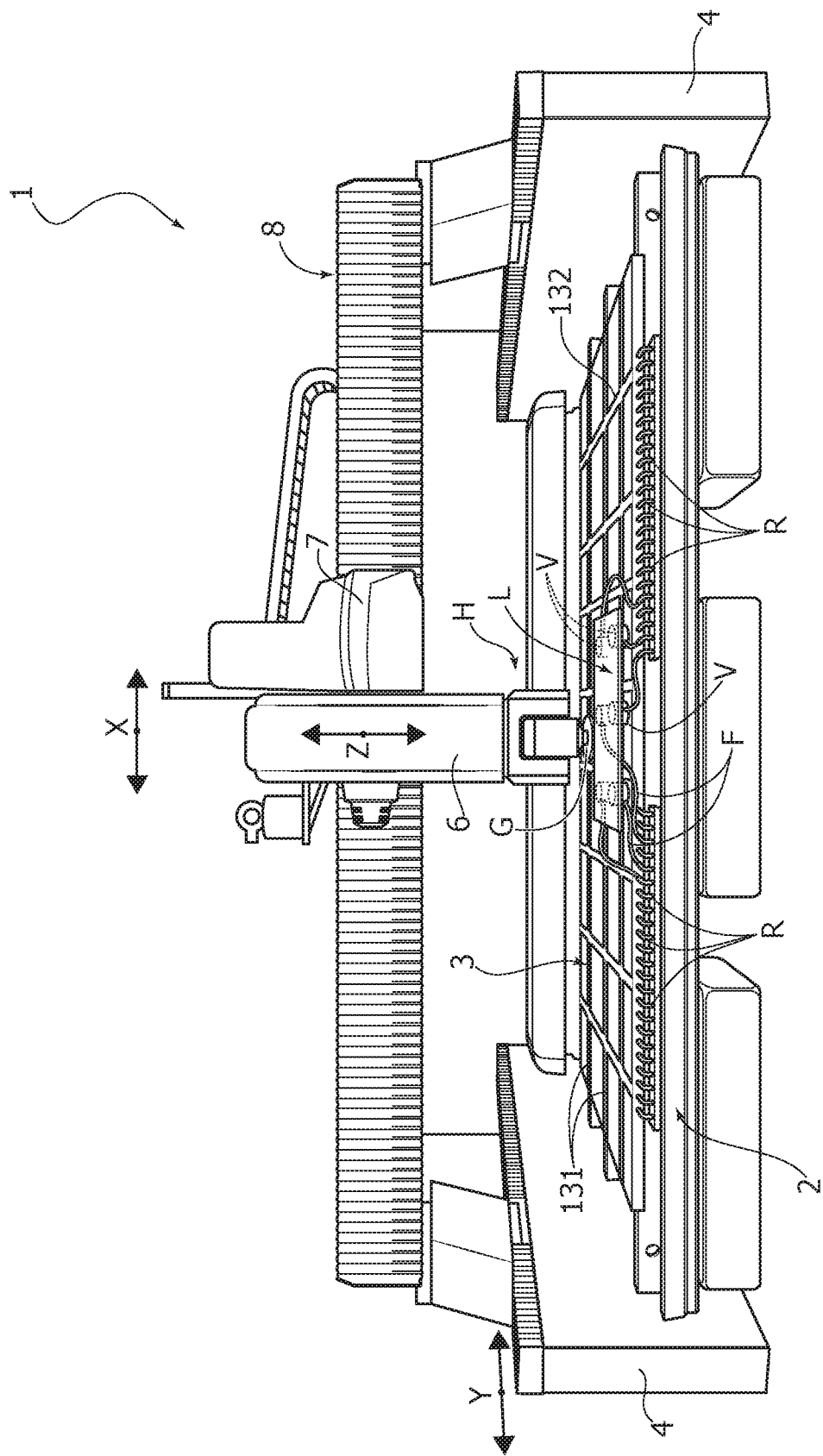
FIG. 2 shows the same work centre as that of FIG. 1 during execution of a grinding operation on the peripheral lateral surface of a plate, where the plate is held on suction-cup supporting blocks, which are arranged on the supporting board of the work centre, in free portions of the surface of the board that are confined between elements of the sacrificial supporting surface.

In FIGS. 1 and 2, the reference number 1 generally designates a numeric-control work centre according to the present invention. The work centre 1 comprises, in a way known per se, a stationary structure including a bench 2 defining a work surface generally designated by 3. On two opposite sides of the bench 2, the stationary structure of the machine includes a pair of side portions 4. The work centre 1 comprises one or more working heads H (in the illustrated example, a single working head H is provided) which, once again in a way known per se, is supported by a slide structure 6 that is movable in a vertical direction Z on a carriage 7. Once again according to the conventional technique, the carriage 7 is slidably mounted in the longitudinal direction X of a cross-member 8 that is movably mounted, in a gantry-like fashion, above the two side portions 4 in a horizontal direction Y orthogonal to the direction X. The movement of the carriage 7 along the cross-member 8 in the direction X, the movement of the cross-member 8 in the horizontal direction Y, and the movement of the slide 6 in the vertical direction Z are controlled by respective electric motors (not illustrated) controlled by an electronic control unit (not illustrated) according to any predetermined machining program.

The constructional details of all the components described above of the work centre are not illustrated herein since they can be made in any known way and do not fall, taken alone, within the scope of the present invention. Moreover, the deletion of these constructional details from the drawings renders the latter more readily and easily understandable.

Once again according to the conventional technique, the working head H is provided with a motor-driven spindle (not visible in the drawings) to which a working tool can be removably coupled.

Normally, in work centres of the type described herein, the working head can be coupled to a grinding tool or a milling tool, to carry out, for example, milling operations to obtain recesses or openings in the plate, or grinding operations to machine the peripheral lateral surface of the plate and the edge of one or more openings formed within the perimeter of the plate (when these are provided) or to carry out any other type of machining operation. In the case of the work centre according to the invention, the working head can also be coupled to a tool for cutting the plate, the tool being typically in the form of a diamond disk blade, designated by D in FIG. 1.

The exemplary embodiment illustrated herein has a single working head H. In this case, the working head H is designed to operate both with a cutting tool and with a grinding or milling tool. The work centre 1 is provided with a tool magazine (not visible in the drawings) on a side of the bench 2, where the working head can be positioned to carry out automatically a tool-change operation. However, the work centre according to the invention could also be provided with a number of working heads, in which case each working head can be dedicated just to cutting operations or just to milling and grinding operations, or else each of the working heads can be provided for carrying out both types of operations.

Figure 3:
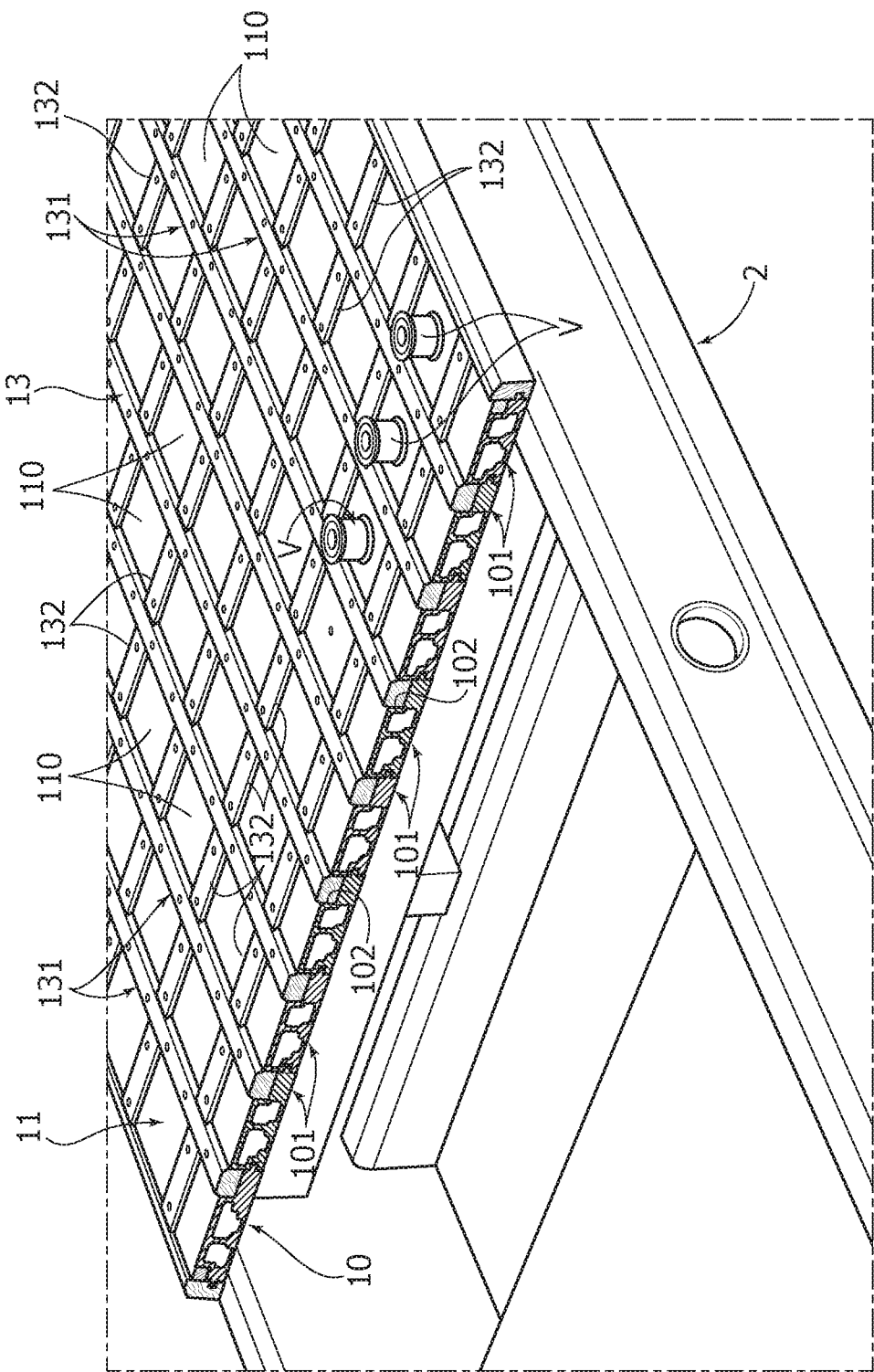
FIGS. 3 and 4 are a cross-sectional perspective view and a cross-sectional view of a detail of the supporting board forming part of the work centre according to the invention, FIG. 4 also illustrating a plate positioned on the sacrificial supporting surface and a plate positioned on suction-cup supporting blocks that engage on the surface of the supporting board.

The work centre 1 is provided with a work surface 3 defined by a supporting board 10 (see FIGS. 3 and 4), the structure of which will be illustrated hereinafter. Purely by way of example, the supporting board 10 is illustrated in FIG. 3 as constituted by a plurality of modular elements 101 in the form of metal sectional elements, which are set alongside one another and define with their top surfaces a first planar and continuous supporting surface 11. Once again with reference to the specific example illustrated in FIG. 3, the metal sectional elements 101 have longitudinal sides with complementary sectional elements in such a way that these metal sectional elements 101 are slotted together and moreover define a plurality of longitudinal slots 102. Received and fixed by means of screws 12 (see FIG. 4) within the longitudinal slots 102 are a plurality of slats of wood 131, which are thus parallel to one another and set at a distance apart, constituting a first array of slats of a sacrificial supporting surface 13 carried by the supporting board 10. In the example illustrated, the slats 131 of the first array are directed parallel to the direction X of the machine. As may be seen in FIG. 3, the top surfaces of the metal sectional elements 101 that define the first supporting surface 11 also have transverse slots, received and blocked within which, for example, by means of screws, are portions of slats of wood 132 arranged orthogonal to the slats 131 of the first array. The portions of slats 132 define a second array of slats set parallel to one another and at a distance apart, orthogonal to the slats 131 of the first array. Both the slats 131 and the portions of slats 132 project above the first supporting surface 11 to define a second supporting surface 14, located at a higher level than the first supporting surface 11.

Of course, the supporting board 10 can have a structure of any type, the specific configuration described above here being provided purely by way of example. In particular, the material of the slats may be any other sacrificial material alternative to wood. The slats could also be arranged in two different, but not orthogonal, directions. In the work centre according to the invention, the plate to be worked is set resting on the second supporting plane 14 defined by the sacrificial supporting surface 13 that is constituted by the slats of wood 131, 132, when it is necessary to carry out a cutting operation, as illustrated in FIG. 1.

Once positioned on the sacrificial supporting surface 13 constituted by the slats of wood 131, 132, the plate remains stationary by gravity during the cutting operation, thanks also to the friction between the bottom surface of the plate and the surface of the slats of wood 131, 132.

During the cutting operation, the disk blade D traverses the plate L positioned on the sacrificial supporting surface 13 throughout the thickness of the plate and projects for a few tenths of millimeter underneath the plate L. In this way, the disk blade D can engrave the slats 131, 132 that it possibly finds along its path, without however interfering with the supporting surface 11 of the supporting board 10.

Once again with reference to the specific example illustrated, the sacrificial supporting surface 13 also includes one or more perimetral slats of wood 133 fixed to the periphery of the supporting board 10 by means of screws 15.

It is important for the structure of the sacrificial supporting surface 13 to be made up of sacrificial elements, such as the slats of wood 131, 132 arranged at a distance apart in such a way as to leave free wide portions of the aforesaid first supporting surface 11 (designated by 110 in FIGS. 2 and 3), confined between the sacrificial elements, which are designed to be removably engaged by blocks V (see FIGS. 2 and 3) for supporting and withholding the plate, which project above the sacrificial elements 131, 132 so as to define a third supporting surface 16 (see FIG. 4) located at a higher level than the second supporting surface 14 defined by the sacrificial supporting surface 13, for supporting and holding a plate L during a grinding or milling operation on the plate (FIG. 2).

Figure 4:
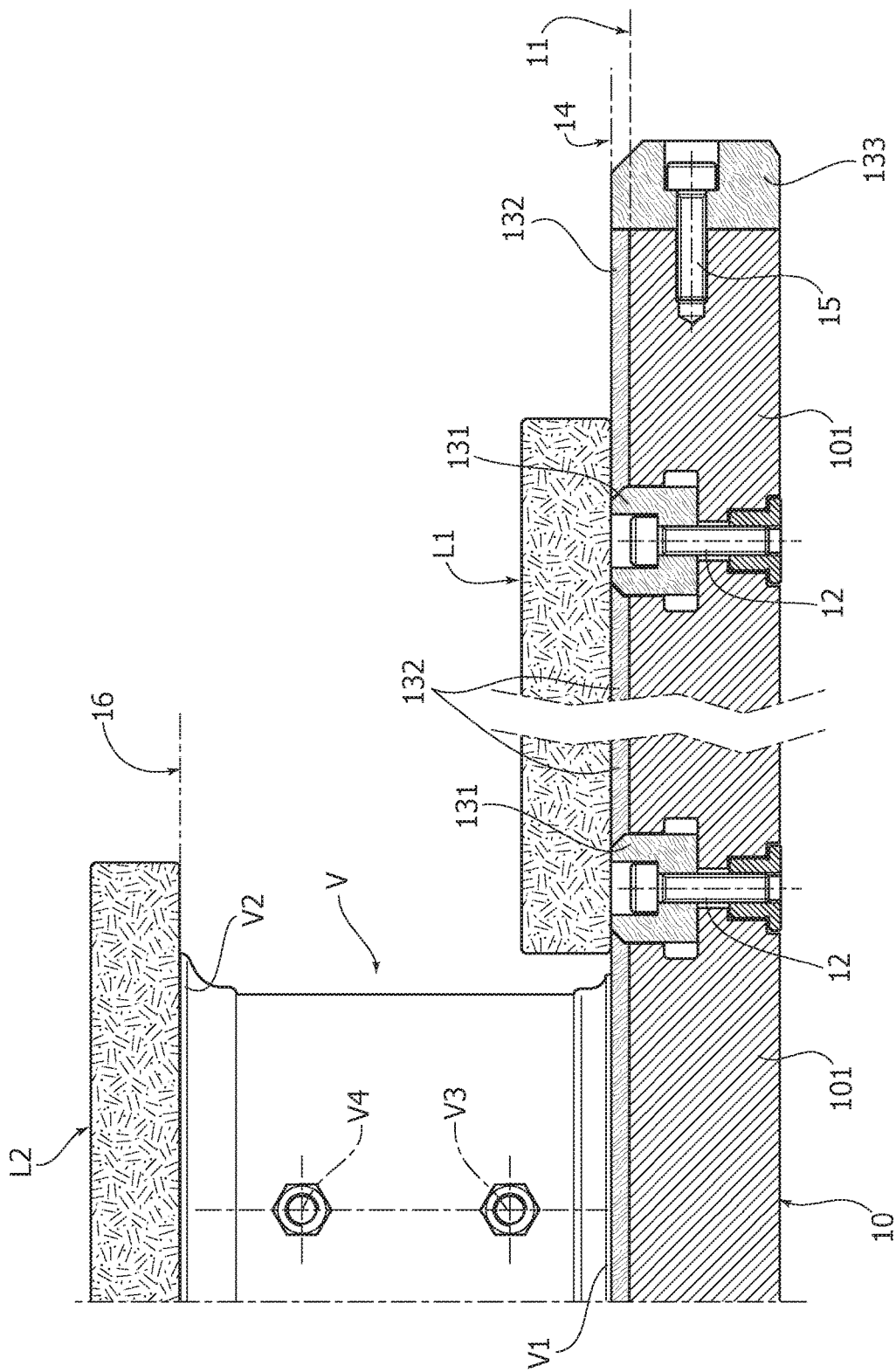

With reference to FIG. 4 (where the modular elements 101 are illustrated only schematically), the blocks V are of the known type including a bottom suction cup V1, a top suction cup V2, and connectors V3, V4 for connecting the suction cups to a source of vacuum provided within the stationary structure of the machine. For this purpose, once again according to the conventional technique, the connectors V3, V4 are connected to the ends of hoses F, which are in turn connected to connectors R provided on the stationary structure of the machine. The present description of the supporting and holding blocks V is provided herein purely by way of example. Alternatively, these blocks may be made in accordance with a known technique developed by the present applicant, according to which each block is provided with an autonomous vacuum source (see document No. EP 2 682 227 A1).

Whatever the structure and configuration of the blocks V, the latter are independent units that can be positioned as desired by the operator in the areas 110 free from slats 131, 132 according to the dimensions and shape of the plate L to be machined. Once the blocks V have been positioned, their bottom suction cups V1 are activated for fixing the blocks themselves to the first supporting surface 11. The plate L is then positioned on the blocks V, and the top suction cups V2 are then activated for holding the plate on the blocks. Once the plate has thus been held in a position raised both with respect to the sacrificial supporting surface 13 and with respect to the supporting surface 11, the working head H can be operated, after associating thereto, for example, a grinding tool G (FIG. 2) having a vertical axis, in such a way as to carry out a grinding machining operation on the peripheral lateral surface of the plate L, or any further necessary machining operation, for example, milling operations required to obtain recesses or openings in the plate L, by using a milling tool.

As is clearly apparent from the foregoing description, the basic idea forming the subject of the present invention consists in providing a work centre with a work surface that can be used both as a sacrificial supporting surface during a cutting operation and as a surface for arranging thereon blocks for supporting the plate during a grinding and/or milling operation on the plate. This is obtained by providing a supporting board, on which the sacrificial elements are arranged and configured in such a way that, on the one hand, an adequate support thereon is guaranteed for the plate that is to undergo a cutting operation and, on the other hand, there are left free portions of the supporting surface of the supporting board that are confined between the sacrificial elements and are distributed on the entire extension of the board, on which the blocks for supporting the plate that is to undergo a grinding and/or milling operation can be engaged. For this purpose, the distancing between the slats 131, 132 of each array is greater than a horizontal dimension of the suction-cup blocks V. In the case of blocks of a cylindrical shape, the aforesaid distancing is in any case greater than the maximum diameter of the blocks V.

Thanks to this simple arrangement, the user can have available a work centre that has a structure that is not more complex and/or more costly than a conventional work centre and that, notwithstanding this, is able to carry out both grinding or milling operations and cutting operations on plates of stone material. Elimination of the need for a machine dedicated just to cutting operations, and consequent elimination of the dead times necessary for transfer of a plate from a machine dedicated to the cutting operation to the numeric-control work centre that carries out subsequent machining operations on the plate, results in an immediate advantage, from the standpoint of productivity of the plant, overall costs of production, and space occupied in the plant.

Naturally, without prejudice to the principle of the invention, the details of construction and the embodiments may vary widely with respect to what is described and illustrated herein purely by way of example, without thereby departing from the scope of the present invention.

What is claimed is:

1. A numeric-control work centre for machining plates of stone, marble, or natural or synthetic stone material, or ceramic material, said work centre comprising:

a work surf ace;

at least one working head movable on the work surface in at least two mutually orthogonal horizontal directions, wherein said working head can be selectively coupled either to a grinding or milling machining tool for performing a grinding or milling machining operation on a plate or to a cutting tool for a cutting operation the plate, wherein said work surface includes:

a rigid supporting board, defining a first planar supporting surface; and a series of sacrificial elements for supporting said plate during said cutting operation, said sacrificial elements being rigidly connected to said rigid supporting board and defining a second supporting surface located at a higher level than said first planar supporting surface of said supporting board, so that said cutting tool coupled to said at least one working head can carry out said cutting operation on said plate arranged on said sacrificial elements for supporting the plate, without interfering with the supporting board; and a third supporting surface located at a higher level than said second supporting surface, and adapted for supporting and holding said plate during said grinding or milling machining operation performed on the plate by said grinding or milling machining tool coupled to said working head and suitable for performing said grinding or milling machining operations on the plate, and further wherein, said series of sacrificial elements for supporting the plate during said cutting operation are rigid and made of a sacrificial material such that said cutting tool used in the cutting operation can pass through the plate and also engrave the sacrificial elements, without interfering with the supporting board, so that the cutting tool can be guided according to any path on the work surface, without being forced to avoid interference with said sacrificial elements, said third supporting surface comprises a plurality of supporting blocks, each supporting block having a bottom suction cup that can be selectively activated for adhering to said first planar supporting surface and a top suction cup that can be selectively activated for holding thereon said plate to be subjected to said grinding or milling machining operation, each support block having a bottom peripheral horizontal width;

wherein the series of sacrificial elements further comprising at least one array of adjacently positioned slats separated a horizontal width apart from each other at least as wide as the support blocks bottom peripheral horizontal width, the at least one array of slats width separation defining free portions of said first planar supporting surface distributed throughout an entire extension of said first planar supporting surface, the free portions operable to allow selective positioning and engagement of the support blocks between adjacent slats for engagement to the first planar supporting surface; and in a condition where said supporting blocks are selectively positioned in respective free portions and engaged on the first planar supporting surf ace, the top suction cups of the supporting blocks project above said sacrificial elements and define said third supporting surface.

2. The work centre according to claim 1, wherein said rigid supporting board is integrated in a bench of said work centre.

3. The work centre according to claim 1, wherein the at least one array of adjacently positioned slats comprises a first array of slats and a second array of slats positioned angularly offset from the first array of slats, each slat in the respective first and the second array of slats positioned parallel to adjacent slats in the respective array separated by the horizontal width apart at least as wide as the supporting block bottom peripheral horizontal width, wherein adjacently positioned slats from the first and the second slat arrays define the free portions operable for selective positioning and engagement of respective supporting blocks to the first planar supporting surface.

4. The work centre according to claim 1 further comprising:

a bench supporting said work surface;

two stationary side portions arranged at opposing two sides of the bench;

an overhead cross-member movably supported above the two side portions in a horizontal direction orthogonal to a horizontal direction of the cross-member, in a gantry-like fashion; and a carriage movable on the cross-member in said horizontal direction of the cross-member, said at least one working head being carried by the carriage and being movable with respect thereto in a vertical direction.

5. A combination work center for use in cutting and machining of plate material, the work center comprising:
- a rigid supporting board defining a first planar supporting surface;
- a plurality of stationary sacrificial elements removably connected to the rigid supporting board, each of the plurality of sacrificial elements positioned a horizontal distance from an adjacent sacrificial element defining a free portion of the first planar supporting surface, the plurality of sacrificial elements defining a second planar supporting surface elevated above the first planar supporting surface, the second planar supporting surface selectively operable to support the plate material for a cutting operation, wherein the plate material can be through cut without cutting the rigid supporting board;
- a plurality of supporting blocks selectively positionable in the free portions and engageable with the first planar supporting surface for a machining operation, each of the plurality of supporting blocks having a bottom peripheral horizontal width less than the horizontal distance between adjacent sacrificial elements, the plurality of supporting blocks defining a third planar supporting surface elevated above the second planar supporting surface, the third planar supporting surface selectively operable to support the plate material during the machining operation without interfering with the stationary sacrificial elements; and
- a working head movable relative to the first planar supporting surface, the working head operable to selectively cut or machine the plate material respectively positioned on one of the second or the third planar supporting surfaces.

6. The work center of claim 5 wherein each of the plurality of supporting blocks further comprising:
- a lower suction cup selectively engageable with the first planar supporting surface; and
- an upper suction cup defining the third planar supporting surface selectively engageable with the plate material to prevent movement of the plate material relative to the first planar supporting surface.

7. The work center of claim 6 wherein the plurality of stationary sacrificial elements further comprises:
- a first array of slats wherein each slat is positioned parallel to adjacently positioned slats separated at the horizontal distance defining the free portions of the first planar supporting surface.

8. The work center of claim 7 wherein the plurality of stationary sacrificial elements comprises:
- the first array of slats; and
- a second array of slats angularly positioned offset from the first array of slats, the second array of slats positioned parallel to adjacently position second array slat at the horizontal distance between adjacent second array slats at least as large as the supporting blocks bottom peripheral horizontal width, wherein adjacently positioned first array slats and second array slats define the respective free portion of the first planar supporting surface for selected receipt of a supporting block.

9. The work center of claim 5 further comprising:
- a bench supporting the supporting board;
- a cross member connected to the bench, the cross member selectively movable in a Y coordinate direction relative to the supporting board; and
- a carriage connected to the cross member, the carriage selectively movable in a X coordinate direction relative to the cross member;
- a slide structure connected to the carriage and the working head, the slide structure selectively movable in a Z coordinate direction relative to the carriage, the cross member, carriage and slide structure operable to selectively position the working head in the X, Y and Z coordinate dimensions relative to the first planar supporting surface.

10. The work center of claim 5 wherein the supporting board further comprises a plurality of elongate modular elements selectively engaged with one another defining the first planar supporting surface, the plurality of elongate modular elements respectively defining longitudinal slots, each longitudinal slot is positioned and operable to receive a sacrificial element.

11. The work center of claim 8 wherein the supporting board further comprises a plurality of elongate modular elements selectively engaged with one another defining the first planar supporting surface, the elongate modular elements respectively defining a plurality of longitudinal slots and transverse lateral slots angularly oriented with respect to the longitudinal slots, each longitudinal slot is positioned and operable to receive a respective one of the first array slats and each transverse lateral slot is positioned and operable to receive a respective one of the second array slats.

12. The work center of claim 11 wherein the first array of slats are continuous and extend substantially the entirety of a length of the first planar supporting surface; and
- the second array of slats comprise a plurality of discontinuous slats extending between respective of the continuous first array of slats.

13. The work center of claim 11 wherein each of the elongate modular members define a closed interior longitudinal channel extending along a length of the elongate modular member.

14. A method for use in cutting and machining an elongate stone or ceramic plate in a single work center device, the method comprising the steps of:
- providing a single work center having a supporting board for supporting an elongate plate and a working head operable for selectively conducting a cutting or machining operation on the elongate plate on the single work center, the working head movable relative to the supporting board along a X, Y and Z axis, the support board defining a first planar supporting surface;
- rigidly securing a plurality of stationary sacrificial slats to the first planar supporting surface at a distance from one another defining free portions of the first planar supporting surface between adjacently positioned sacrificial slats, the sacrificial slats defining a second planar supporting surface elevated above the first planar supporting surface;
- placing the plate in abutting engagement with the sacrificial slats atop the second planar supporting surface when the working head is configured for conducting the cutting operation on the elongate plate, wherein the cutting operation does not interfere with the first planar supporting surface;
- selectively positioning a plurality of supporting blocks in respective of the free portions between adjacently positioned stationary sacrificial slats without removing the sacrificial slats from the first planar supporting surface when the working head is configured for conducting the machining operation on the elongate plate, the plurality of supporting blocks defining a third planar supporting surface elevated above the second planar supporting surface;

engaging the plurality of supporting blocks to the first planar supporting surface in the respective free portion when the working head is configured for conducting the machining operation on the elongate plate;

placing the elongate plate in abutting engagement with the supporting blocks atop the third planar supporting surface when the working head is configured for conducting the machining operation on the elongate plate, wherein the machining operating does not interfere with the plurality of stationary sacrificial slats; and selectively conducting the cutting or machining operation when the elongate is respectively positioned atop the second planar supporting surface or the third planar supporting surface.

15. The method of claim 14 further comprising the step of:

selectively engaging the plurality of supporting blocks to the elongate plate preventing relative movement of the elongate plate relative to the supporting blocks.

16. The method of claim 15 wherein the step of rigidly securing a plurality of sacrificial slats to the first planar supporting surface further comprises the step of:

positioning each of the plurality of slats in one of a longitudinal or transverse lateral slot defined by the first planar supporting surface.

17. The method of claim 15 further wherein the steps of engaging the supporting blocks to the first planar supporting surface and the elongate plate further comprise the step of:

connecting the supporting blocks to a pneumatic vacuum source;

removing air from between the connecting blocks and the first planar supporting surface and the elongate plate preventing relative movement between the elongate plate and the first planar supporting surface.

* * * * *